US007245587B2

(12) United States Patent
Phaal

(10) Patent No.: US 7,245,587 B2
(45) Date of Patent: Jul. 17, 2007

(54) METHOD TO ASSOCIATE INPUT AND OUTPUT INTERFACES WITH PACKETS READ FROM A MIRROR PORT

(75) Inventor: Peter Phaal, San Francisco, CA (US)

(73) Assignee: InMon Corporation, San Francisco, CA (US)

( * ) Notice: Subject to any disclaimer, the term of this patent is extended or adjusted under 35 U.S.C. 154(b) by 937 days.

(21) Appl. No.: 09/745,260

(22) Filed: Dec. 20, 2000

(65) Prior Publication Data

US 2002/0075809 A1    Jun. 20, 2002

(51) Int. Cl.
*H04L 1/00* (2006.01)
*H04J 1/16* (2006.01)
*H04J 3/14* (2006.01)
(52) U.S. Cl. .................. 370/244; 370/245; 370/252
(58) Field of Classification Search ........ 370/241–242, 370/244–245, 250, 252–253, 389, 395.1, 370/395.31
See application file for complete search history.

(56) References Cited

U.S. PATENT DOCUMENTS

| | | | | |
|---|---|---|---|---|
| 4,922,488 | A | * | 5/1990 | Niestegge .................. 370/413 |
| 5,256,958 | A | | 10/1993 | Eng et al. .................. 370/389 |
| 5,615,323 | A | | 3/1997 | Engel et al. ................ 395/140 |
| 5,790,799 | A | | 8/1998 | Mogul .................. 395/200.54 |
| 5,982,753 | A | * | 11/1999 | Pendleton et al. .......... 370/252 |
| 6,085,243 | A | | 7/2000 | Fletcher et al. ............. 709/224 |
| 6,108,782 | A | * | 8/2000 | Fletcher et al. ............. 370/245 |
| 6,308,148 | B1 | | 10/2001 | Bruins et al. ................. 703/27 |
| 6,308,220 | B1 | * | 10/2001 | Mathur ....................... 709/238 |
| 6,356,532 | B1 | * | 3/2002 | Richardson et al. ........ 370/248 |
| 6,425,015 | B1 | * | 7/2002 | Jennings et al. ............ 709/238 |
| 6,473,400 | B1 | | 10/2002 | Manning .................... 370/229 |
| 6,529,475 | B1 | | 3/2003 | Wan et al. .................. 370/231 |

(Continued)

OTHER PUBLICATIONS

Brownlee, N., *Traffic Flow Measurement: Meter MIB*, Network Working Group, The University of Aukland, Jan. 1997, pp. 1-38.

(Continued)

*Primary Examiner*—Doris H. To
*Assistant Examiner*—Saba Tsegaye
(74) *Attorney, Agent, or Firm*—Bingham McCutchen LLP

(57) ABSTRACT

The network monitoring system includes a monitor device coupling to a network switch through a mirror port interface of the network switch. The network switch supports a number of regular port interfaces connected to different network components and the mirror port connected to the monitor device. The mirror port mirrors all network traffic of any selected regular port interfaces of the network switch. When the monitor device receives a data packet from the network switch, the monitor device extracts the network address information from such as the source and destination address from the data packet. The monitor device then examines internal lookup tables to determine whether there are corresponding physical port interface for the network address information. If the corresponding physical port interfaces for the network address information are not available in the lookup table, the monitor device interrogates the network switch for the corresponding physical port interface. The network address information is placed in a first-in-first-out buffer temporarily until the network switch responses to the monitor device's request. Finally, the monitor device uses the physical port interface to perform further network analysis functions.

39 Claims, 7 Drawing Sheets

U.S. PATENT DOCUMENTS

| | | |
|---|---|---|
| 6,587,878 B1 | 7/2003 | Merriam ..................... 709/224 |
| 6,724,729 B1* | 4/2004 | Sikdar ........................ 370/241 |
| 6,785,286 B1* | 8/2004 | O'Keeffe et al. ........... 370/397 |
| 6,886,102 B1* | 4/2005 | Lyle ........................... 713/201 |
| 6,889,245 B2* | 5/2005 | Taylor et al. ............... 709/203 |
| 6,894,972 B1 | 5/2005 | Phaal ......................... 370/229 |
| 7,164,657 B2 | 1/2007 | Phaal ......................... 370/235 |
| 2001/0055274 A1* | 12/2001 | Hegge et al. ............... 370/229 |
| 2002/0067726 A1* | 6/2002 | Ganesh et al. .............. 370/392 |
| 2003/0185152 A1* | 10/2003 | Nederveen et al. ......... 370/229 |

OTHER PUBLICATIONS

Claffy, K., et al., *Application of Sampling Methodologies to Network Traffic Characterization*, Computer Systems Laboratory, pp. 1-10.

* cited by examiner

Special switch port set up for port aliasing.
This port is tied directly to the switch backbone ns. More particularly, the present invention relates to an apparatus and method to analyze the performance of a network switch by monitoring port interfaces of the switch.

METHOD TO ASSOCIATE INPUT AND OUTPUT INTERFACES WITH PACKETS READ FROM A MIRROR PORT

BACKGROUND OF THE INVENTION

The present invention relates to network monitoring systems. More particularly, the present invention relates to an apparatus and method to analyze the performance of a network switch by monitoring port interfaces of the switch.

In a switched network, the problems and solutions of a shared network do not always apply. Each node may have a dedicated switched port, so bad packets from that node do not affect the rest of the nodes on the network. This feature is somewhat offset by the fact that troubleshooting switched networks is more difficult and requires more specialized tools. No longer can a conventional local area network (LAN) analyzer see all packets and determine which node is the cause of the problem. For this reason, measuring overall traffic levels and studying individual frame statistics is not straightforward in a switched environment. Several switch vendors have proposed ways to remedy this problem with innovative techniques, such as internal RMON data collection and switch port aliasing.

A packet is only forwarded to one port on the switch, so a LAN analyzer connected to one port of a switch will not, by definition, catch all packets flowing through the switch. Many switch vendors have attempted to solve the traffic-monitoring problem by designing statistic collecting modules into the switch. These modules are either based on RMON statistics or a proprietary collection mechanism. For instance, some commercially available network switches keep RMON and SNMP statistics on each packet and can report overall switch traffic levels to any SNMP agent or any proprietary management software.

These modules can diagnose traffic-level problems on a switch with the previously mentioned techniques. Unlike shared networks, however, switched networks do not suffer from throughput degradation due to faster nodes and too many nodes, so these may not cause problems on a switched network. In a workgroup switch, each new user receives a certain amount of dedicated bandwidth. As long as the high bandwidth connection to the switch can handle the traffic, no traffic-level problems should occur.

Individual frame analysis on a switch provides an interesting proposition. Packets are not forwarded to all ports on a switch, so there is no logical place to plug in a LAN and view all packets. Switch vendors have designed many ways to overcome this troubleshooting drawback. Two ways are port aliasing and adding a repeater to monitor a port.

Port aliasing, also called port mirroring or port spanning, is a mechanism by which a switch monitors all traffic flowing through one or any combination of selected ports and mirrors the network traffic to a special alias port. In additional, in some designs, only a portion of the network traffic of the selected port(s) is mirrored to the alias port for analysis. This allows a LAN administrator to examiner switch traffic one port at a time. If problematic packets are coming from a switch, they can usually be isolated in this fashion. FIG. 1 shows how port aliasing works.

Even if a switch does not have advanced troubleshooting features, such as statistics-gathering modules and port aliasing, a few tricks can still be used to troubleshoot problematic switched networks. Adding a repeater is one such method. Adding a repeater refers to cascading a suspected problem node through a repeater into a switch, as shown in FIG. 2. A port and a LAN analyzer are both connected to the repeater, and the repeater is, in turn, connected to the switch port. In this fashion, the analyzer can monitor any port on a switch for bad frames and other error conditions.

Although adding a repeater is a cheap and simple way to troubleshoot a switched network, it does have its drawbacks. When a repeater is inserted between the end node and the switched port, it is effectively changing the characteristics of the connection. For instance, collisions may now occur on the wire, whereas before they did not. If the switch-to-client connection was full-duplex before, it will become half-duplex after adding a repeater. These subtle changes in the connection could change the dynamics of the problem the system is trying to troubleshoot. There have also been some recent developments in using optical links to passively tap the switched port so that the basic characteristics of the connection are not changed.

However, unfortunately, the data produced by the protocol analyzer does not accurately reflect the traffic patterns with the switch, especially if more than one port is being mirrored. This is because the protocol analyzer is unable to distinguish the port that the packet was received on or sent to. Understanding how the packets are flowing through the switch is crucial to properly understanding which resources within the switch are being stressed. Ideally measurements should be made within the switch that captures these relationships. A novel method of monitoring and measuring the network traffic is disclosed in a copending U.S. patent application Ser. No. 09/438,680, titled "INTELLIGENT COLLABORATION ACROSS NETWORK SYSTEM," filed by the same inventor of the present invention, and the patent application is hereby incorporated entirely by reference.

SUMMARY OF THE INVENTION

It is therefore an object of the present invention to provide a method and apparatus to monitor the network traffic of a network switch.

It is another object of the present invention to monitor the network traffic of a network switch using a mirror port of the network switch.

It is yet another object of the present invention to reconstruct the network traffic using the mirror port of the network switch by analyzing the information that could have been provided by an embedded traffic monitor.

The network monitoring system according to the present invention comprises a monitor device coupling to a network switch through a mirror port interface of the network switch. The network switch supports a number of regular port interfaces connected to different network components and the mirror port connected to the monitor device. The mirror port mirrors all or a selected portion of the network traffic of any selected regular port interface(s) of the network switch. When the monitor device receives a data packet from the network switch, the monitor device extracts the network address information such as the source and destination address from the data packet. The monitor device then examines internal lookup tables to determine whether there are corresponding physical port interfaces for the network address information. If the corresponding physical port interfaces for the network address information are not available in the lookup table, the monitor device interrogates the network switch for the corresponding physical port interfaces. The data packet is placed in a first-in-first-out buffer temporarily until the network switch responses to the monitor device's request. Finally, the monitor device uses the physical port interfaces to perform further network analysis functions.

Additional objectives, features and advantages of various aspects of the present invention will become apparent from the following description of its preferred embodiments, which description should be taken in conjunction with the accompanying drawings.

DETAILED DESCRIPTIONS OF THE PREFERRED EMBODIMENT

Figure 1:
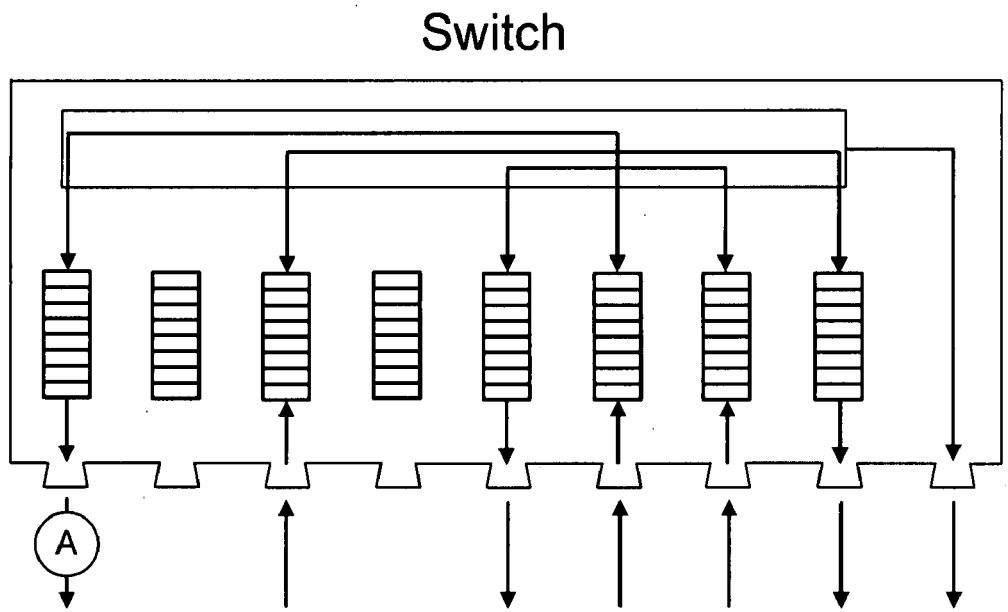
FIG. 1 shows an example illustrating how port aliasing works.
Figure 2:
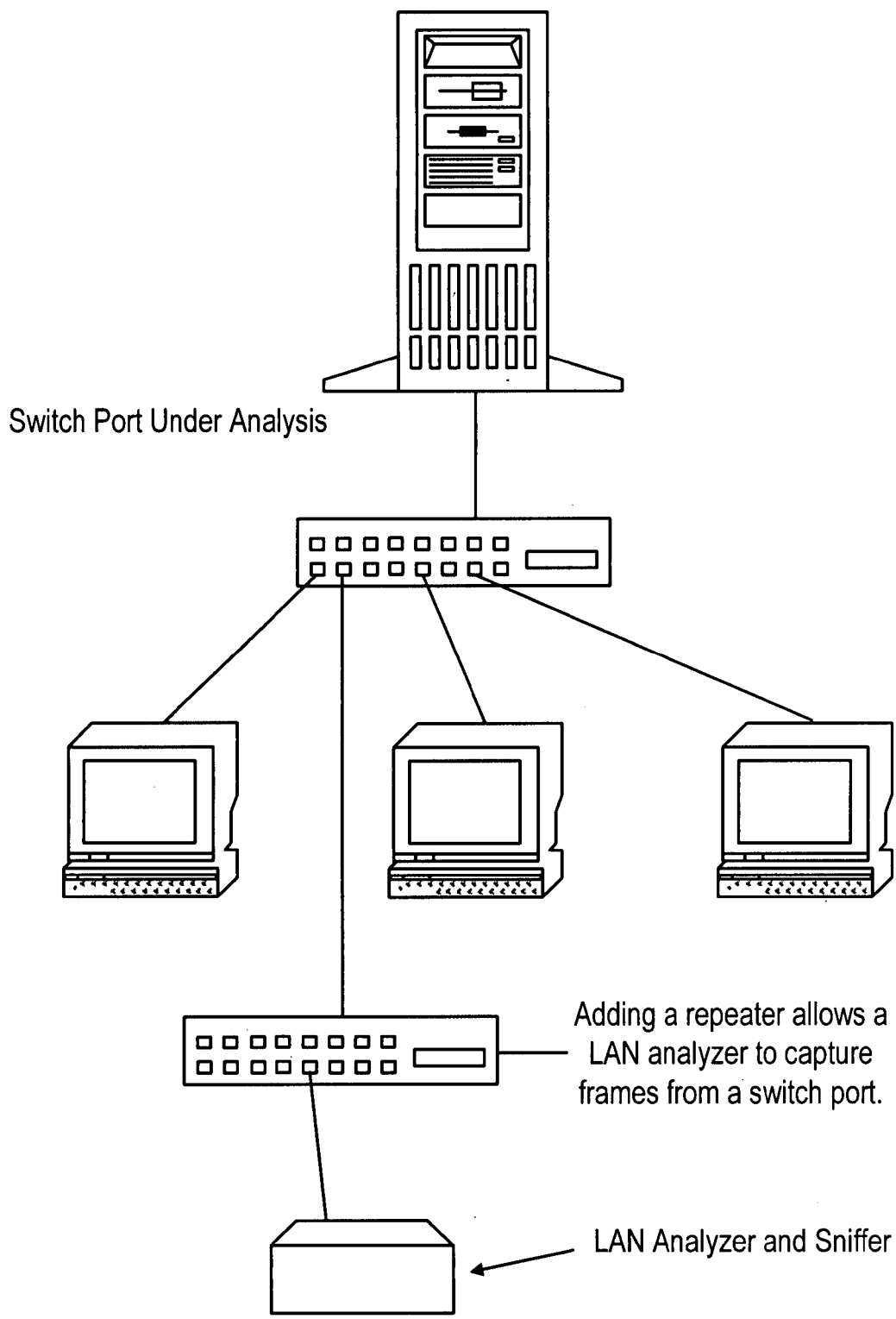
FIG. 2 shows a network monitoring system using an additional repeater to cascade a suspected problem node through a repeater into a switch.
Figure 3:
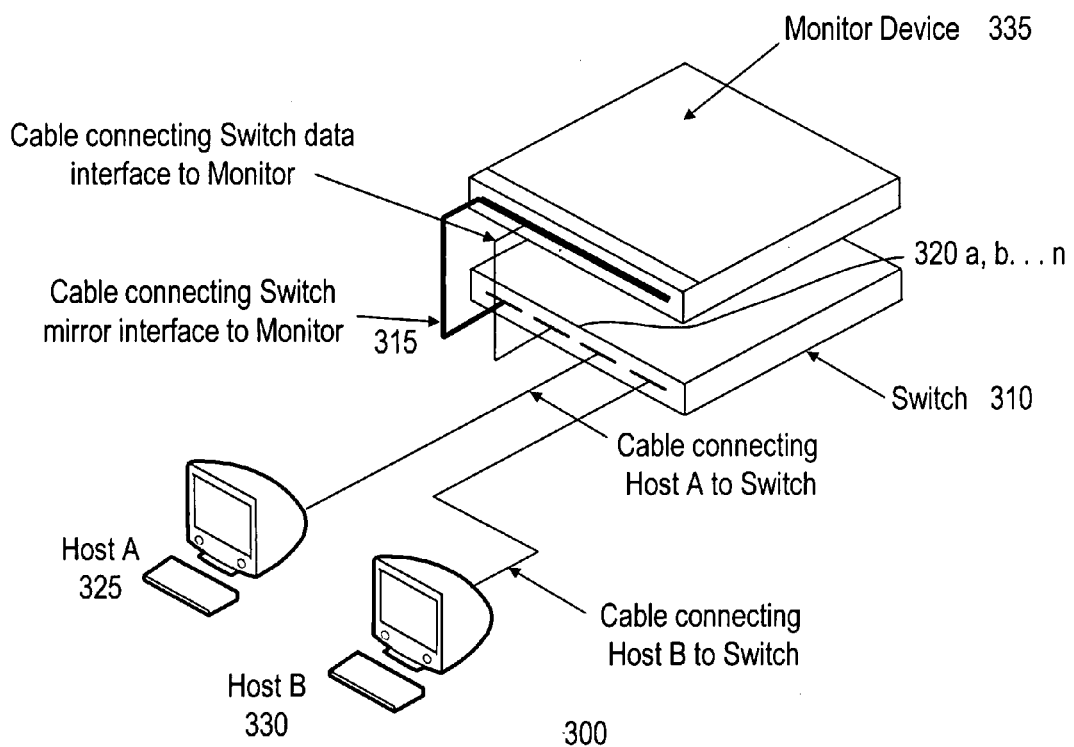
FIG. 3 shows the basic elements of a network monitoring system according to the present invention

FIG. 3 shows the basic elements of a network monitoring system 300 according to the present invention. The network monitoring system 300 is designed to monitor the performance of a network switch 310 by collecting statistical information of the port interface(s) of the switch 310. In the present example, one of the port interfaces of the switch is a mirror port 315 that is able to mirror at least some network traffic flowing through any selected ports. According to the present invention, a monitor device 335 can report switch traffic levels of one or any combination of the port interfaces 320a,b . . . m of the switch 310 and therefore can diagnose traffic-level problems on the switch 310. For example, the mirror port 315 can mirror only one selected port interface, or mirror a combination of more than one port interfaces of the network switch. In the example as shown in FIG. 3, two computers, Host A 325 and Host B 330, are connected to two port interfaces on the switch 310. In this preferred embodiment, the monitor device 335 is further connected to one of the switch port interfaces for communicating with the network switch 310.

According to the present invention, the monitor device 335 is coupled to the mirror port 315 of the network switch 310 so that all network traffic passing across the mirror port 310 will be forwarded to the monitor device 335. Therefore, the monitor device 335 can monitor and provide information about the network traffic passing through any port interface(s) of the network switch 310. This information may include statistics characterizing traffic load of any of the port interfaces 320a,b . . . m.

In one preferred embodiment of the present invention, the monitor device 335 maintains lookup tables that map network addresses to the port interface indexes and the physical port interfaces. Each network address embedded in the data packet can be looked up in the table so that the associated physical port interface can be identified. By providing the monitor device 335 the physical port interface information for network address contained in each data packet passing through the mirror port 315, the monitor device 335 is able to examine and accurately analyze the packet flows through the examining port(s).

As discussed above, the monitor device 335 according to the present invention maintains internal lookup tables that associate the network addresses with the physical port interface that the data packets are received from. These internal lookup tables are continuously updated by learning from the network traffic. For example, when a data packet is received on the mirror port interface 315, the source and destination address of that data packet is recorded and associated with the corresponding port interfaces. One of the features of the present invention is the method to propagate these tables.

Figure 4:
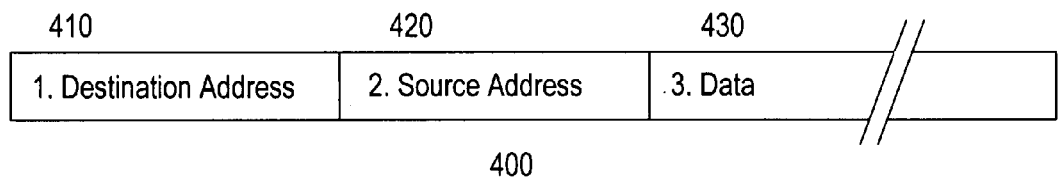
FIG. 4 shows the essential elements of a sample data packet passing through a network switch.

FIG. 4 shows the essential elements of a sample data packet 400 passing through a network switch. As shown in the figure, a data packet 400 contains a source address 410, a destination address 420, and other data 430. The source address 410 and the destination address 420 denote the network addresses of the sender and the receiver respectively. Conventionally, each node has a unique network address. The first three bytes of the network address are called the block ID or organizationally unique identifier (OUI) and identify the manufacturer of the equipment. The IEEE assigns them. The other three bytes are called the device ID and are assigned to each device by each manufacturer. These numbers are always unique.

Figure 5:
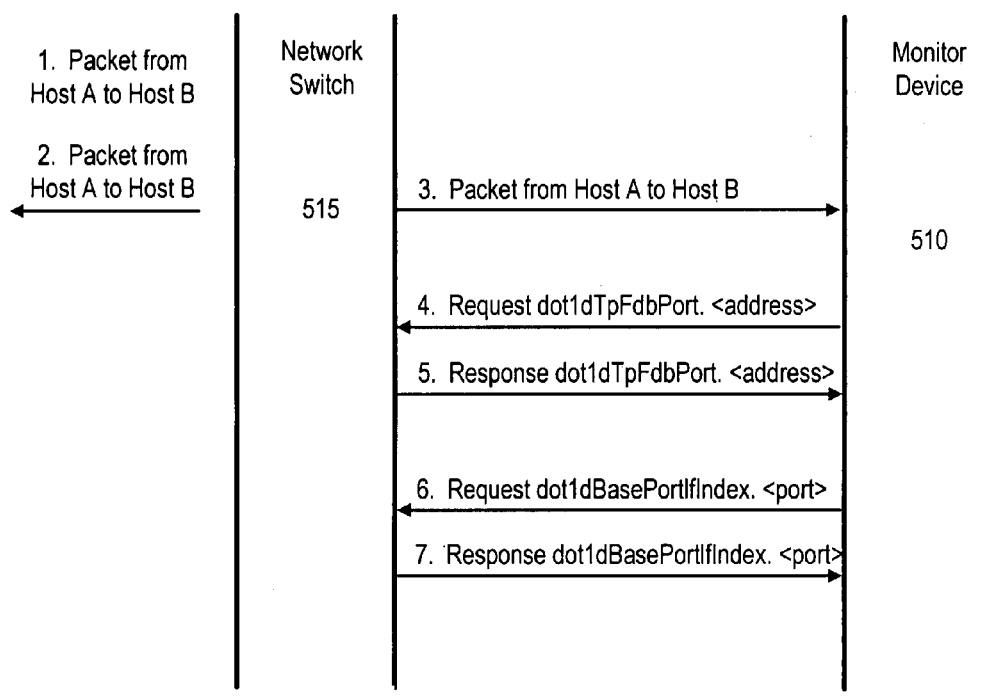
FIG. 5 is an example illustrating the exchanging of a data packet between the monitor device and the network switch according to the present invention

FIG. 5 is an example illustrating the exchanging of a data packet between the monitor device 510 and the network switch 515 according to the present invention. The monitor device 510 is connected to the network switch 515 through the mirror port. In this example, the mirror port interface mirrors the network traffic of the port interface connecting Host B and the network switch. Therefore, the data packet sent from Host A to Host B is mirrored and forwarded to the monitor device through the mirror port. In this embodiment, the network switch 515 supports Simple Network Management Protocol ("SNMP") and is able to process messages relating to the Bridge MIB (Management Information Base) as defined by RFC 1493. However, the present invention also supports other forms of communication between the monitor device and the network switch. For example, the monitor device can communicate with the network switch using any commercially available or propriety communication protocol.

In this preferred embodiment according to the present invention, the monitor device performs the following steps when the data packet flows from Host A to Host B is mirrored on the mirror port interface:

1. Host A generates a data packet containing the source address of Host A and the destination address of Host B. The data packet is sent to the network switch.

2. The switch examines the destination address and forwards the data packet to the port interface connected to Host B.

3. The switch copies the data packet and sends a copy of the data packet to the monitor device through the mirror interface.

4. The monitor device examines the data packet and extracts the source address and destination address embedded in the data packet. When the lookup tables in the monitor device do not contain an entry for any of the source and destination addresses, the monitor device issues an SNMP request to the network switch to obtain the logical port index associated with the network address.

5. The switch sends an SNMP response containing the port index associated with the network address back to the monitor device.

6. Using the port index information, the monitor device issues a second SNMP request to the network switch to inquire the physical port interface (i.e. an index that is locally unique to that port interface) associated with the logical port index.

7. The switch returns an SNMP response containing information about the physical port interface associated with the logical port index to the monitor device.

After receiving the physical port interface information, the monitor device can either update the lookup table or create new entry for the lookup table.

Figure 6:
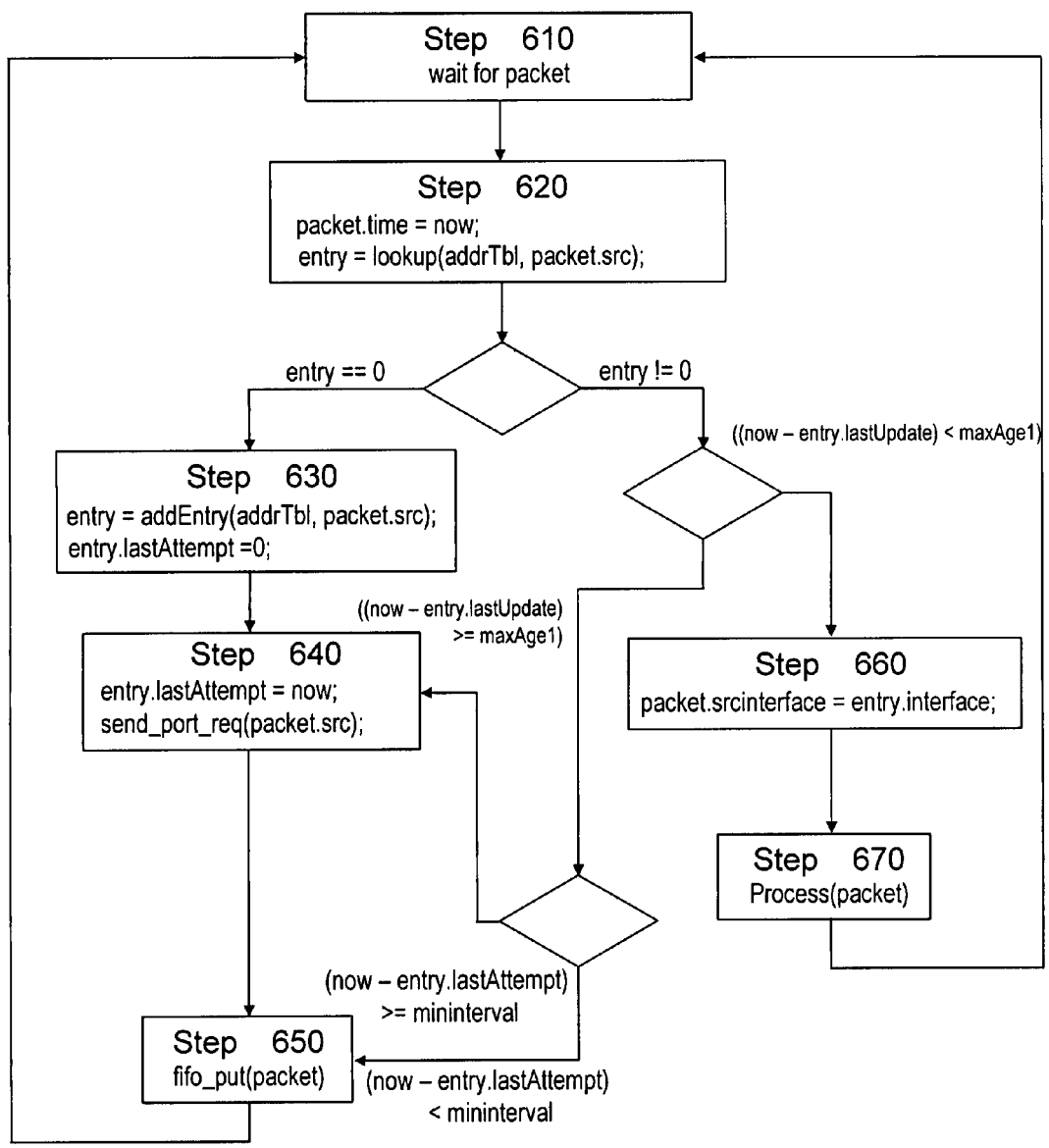
FIG. 6 is a flow chart showing the sequence of events taken place when the monitor receives a packet from the mirror port interface.
Figure 7:
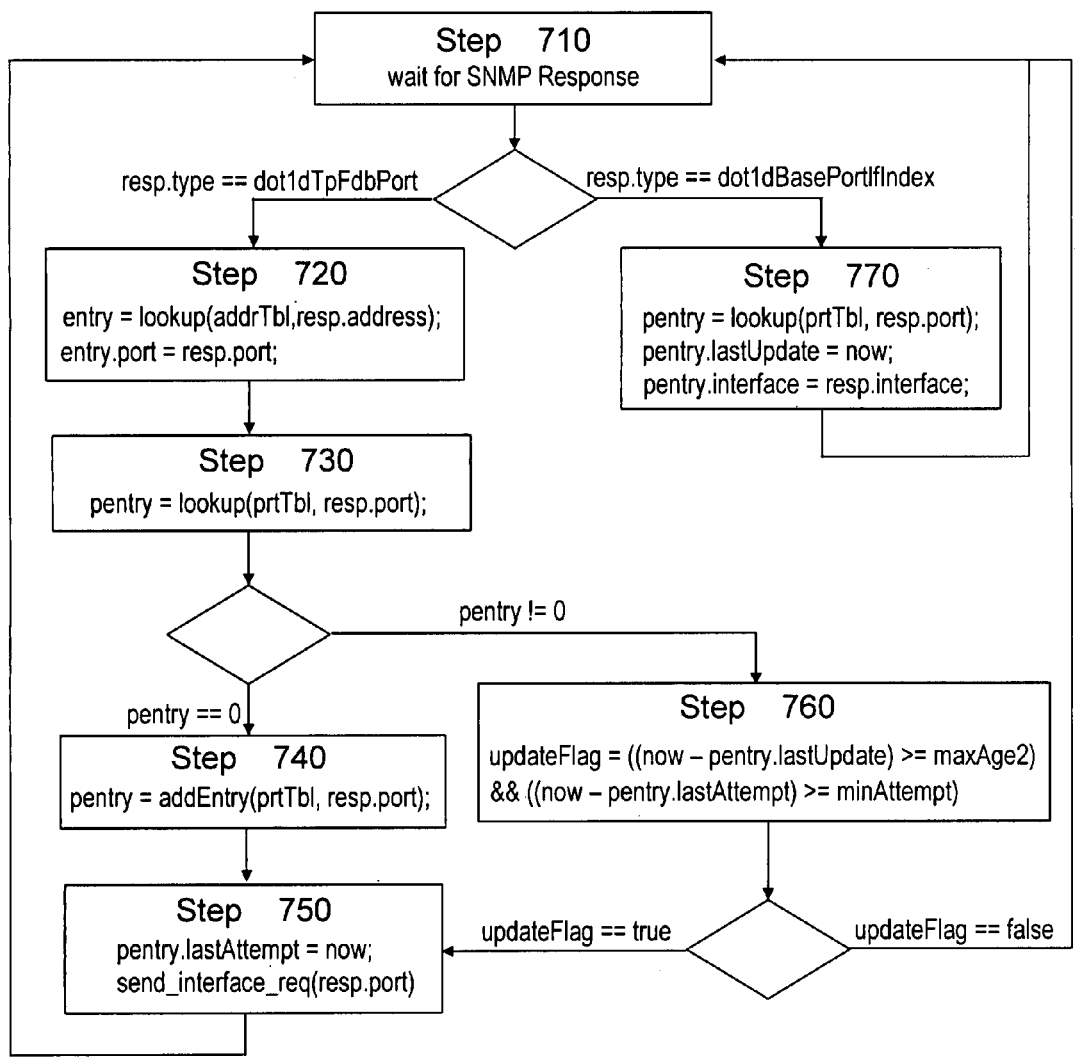
FIG. 7 is a flow chart showing the sequence of events taken place when the monitor device receives an SNMP response from the switch.
Figure 8:
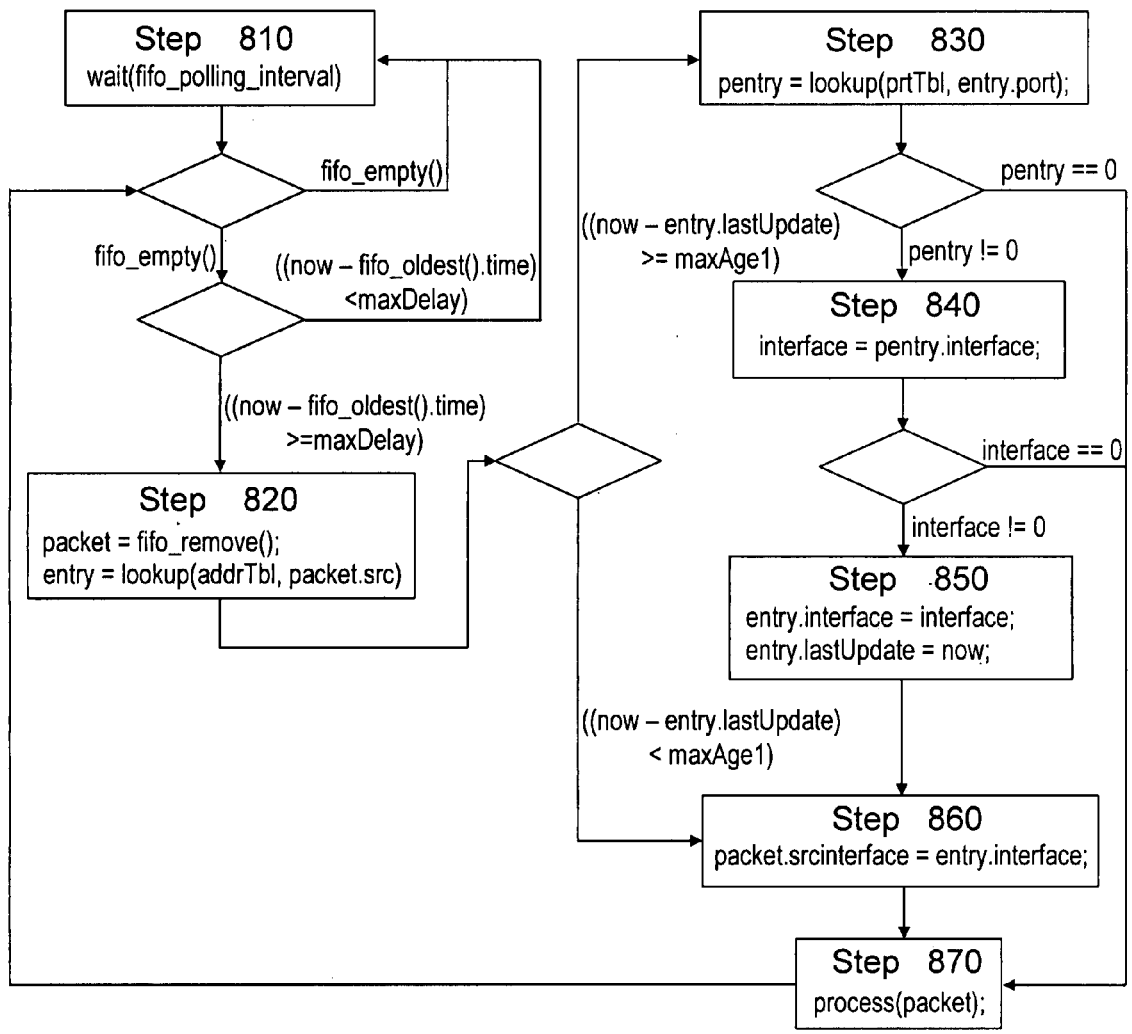
FIG. 8 is a flow chart showing how the monitor device removes the data packet entry from the FIFO.

FIGS. 6, 7 and 8 are flow charts describing the algorithm of how the monitor device maps network addresses to switch interfaces. In the interests of clarifying the algorithm, it is described in terms of identifying the switch interface that data packets are received on (i.e. the switch interface associated with the source address). The algorithm should equally be applied to the destination address to identify the switch interface that packets are sent on.

According to the present invention, the monitor device maintains two internal lookup tables to assist the translation: (1) Address Table ("addrTbl") for mapping a network address to a port index; and (2) Port Table ("prtTbl") for mapping a port index to a physical port interface. If an entry exists in these two tables, the monitor maps the network address to the corresponding physical switch interfaces and the mapping function is then complete. Otherwise, an entry for the data packet is put into a first-in-first-out buffer ("FIFO") for a short period of time to allow the monitor device to interrogate the network switch and create a new mapping entry. When the packet is removed from the FIFO, the entry corresponding the source and destination addresses should now exist and the interface information can be associated with the packet.

FIG. 6 is a flow chart showing the sequence of events taken place when the monitor receives a packet from the switch mirror interface.

In Step 610, the monitor device waits to receive a data packet passing across the mirror port. When the monitor device receives a data packet from the mirror port, the data packet is time stamped and the source address is extracted from the data packet. The monitor then checks the address tables addrTbl to see whether there is an entry for the source address (Step 620). If the address table addrTbl does not contain an entry for the source address, a new entry for the source address is created (Step 630). If a new entry is needed or an existing entry is stale and needs refreshing, the monitor device then interrogates the network switch for the corresponding port interface index to the source address. The monitor device issues an SNMP request to the network switch to get the port interface index associated with the source address. The monitor device sends an SNMP_GET request to the switch to map the source address to the corresponding port index. (i.e. SNMP_GET . 1.3.6.1.2.1.17.4.3.1.2.<a1>.<a2>.<a3>.<a4>.<a5>.<a6>, where a1 . . . a6 are the 6 bytes of an address will return an integer index for the associated port. The time of the SNMP request is then noted in this step (Step 640). In Step 650, when the switch responds to the request with the corresponding port index for the source address, the data packet is added to the first-in-first-out buffer FIFO (see Figure). The process is then looped back to Step 610. On the other hand, when the address table addrTbl contains an entry for the source address, a valid existing entry was obtained from the address table addrTbl. The entry in the port table prtTbl is used to obtain the switch interface for this source address in Step 660. After the entry is obtained from the table prtTbl, the mapping algorithm is completed and the packet can be handed off for analysis in Step 670.

FIG. 7 is a flow chart showing the sequence of events taken place when the monitor device receives an SNMP response from the switch.

In Step 710, the monitor device waits for an SNMP response. If the response is for responding to a previous network address to port index mapping request, then the corresponding port interface index is provided to the monitor device. The corresponding entry in the address table addrTbl is updated with the port index from the SNMP response (Step 720). The entry in the port table prtTbl associated with the port index is identified in Step 730. If an entry does not exist for this port, an entry is created (Step 740). If the entry is new, or an existing entry is stale and needs refreshing, an SNMP request is made to find the switch interface associated with the port index. The monitor device then sends another SNMP_GET request to the switch to map the port index to the corresponding physical port interface. (i.e. SNMP_GET .1.3.6.1.2.1.17.1.4.1.1.<i>, where i is the index returned in the previous query gives the physical port interface associated with the index (Step 750). The monitor device then determines whether a new request can be issued. If the entry is stale and no requests have been made within a specified interval (minAttempt), then a new request is allowed (Step 760) If the request is to a switch port to switch interface request, then the monitor device updates the entry in the port table prtTbl associated with the switch port in Step 770.

FIG. 8 is a flow chart showing how the monitor device removes the data packet entry from the FIFO.

In Step 810, the monitor device waits for a short time interval (fifo_polling_interval). In Step 820, if there is a packet in the FIFO and it has been there for the maximum period set by the parameter maxDelay then remove it from the FIFO. The monitor device then finds the entry in the address table corresponding to the source address in the packet. In Step 830, if the mapping obtained from the address table is stale, the monitor device lookups the entry in the port table prtTbl corresponding to the port interface obtained from the address table addrTbl. In Stepp 840, if there is a valid entry in the port table prtTbl, then the associated physical port interface is obtained. In Step 850, if the interface is valid, then the entry in the address table addrTbl is updated. In step 860, if there is a valid entry in the address table, or if the corresponding entry is just updated, the entry is used to obtain the port interface index for the source address. Finally, in Step 870, when the corresponding physical port interface for the network address is obtained, the data packet off for analysis—even if the source interface of the source address is not successfully mapped. However, the data packet is less useful for network traffic analysis because of lack of physical port interface information.

In another preferred embodiment according to the present invention, the similar technique is applied to a network switch performing routing functions. In this embodiment, the monitor device monitors the network traffic of the routing switch by associating routing information with data packets obtained from the mirror port of the routing switch. The routing switch has an internal routing table containing the routing information relating to destination networks. The monitor device can obtain the information regarding the routing table from the routing switch through SNMP requests (using the MIB-II specification described in RFC 1213). In this embodiment, the monitor device downloads the routing table into its internal memory and then makes queries against the routing table that maps a network address to a subnet and subnet mask, switch interface, next hop router and Autonomous System (AS) number path in the case of routers using Border Gateway Protocol (BGP) routing protocol. According to this preferred embodiment, the monitor device periodically updates the routing table by copying the routing table from the routing switch using SNMP requests (or any other commercially available/propriety communication protocol).

In another embodiment according to the present invention, the routing switch is designed to respond to inquiry for routing and port interface information relating to a particular network address. In this case, the monitor device is not required to maintain a duplicated copy of the routing table because the routing switch performs the actual routing table lookup upon each request from the monitor device. This embodiment is similar to the method as discussed with FIGS. 6, 7, and 8. In this embodiment, the requested routing information is obtained from the routing tables located in the routing switch.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed is:

1. A method of monitoring a network switch having a plurality of regular ports between which network traffic data packets are forwarded and an external mirror port, comprising:
   selecting at least one of said regular ports;
   mirroring a data packet of said selected port to said external mirror port;
   extracting the network address information of said mirrored data packet;
   determining port information of said network address information in response to said network address information extraction; and
   performing network analysis of said network switch.

2. The method of claim 1, wherein said port information comprises physical information.

3. The method of claim 1, wherein said port information determination comprises interrogating said network switch to obtain said port information using said network address information.

4. The method of claim 3, wherein said interrogation comprises:
   sending a first request to said network switch requesting a port index corresponding to said network address information; and
   sending a second request to said network switch requesting said port information corresponding to said port index.

5. The method of claim 4, wherein said port information determination comprises placing said mirrored data packet in a first-in-first-out buffer waiting for responses from said network switch.

6. The method of claim 5, wherein said port information determination further comprises releasing said mirrored data packet from said first-in-first-out buffer after said network switch responds to said requests.

7. The method of claim 5, wherein said port information determination further comprises releasing said mirrored data packet from said first-in-first-out buffer after a predetermined period of time.

8. The method of claim 1, wherein said network address information extraction and said port information determination are performed in an external monitor device.

9. The method of claim 1, further comprising maintaining at least one lookup table correlating said network address information with said port information.

10. The method of claim 1, wherein said network address information comprises a source address of said mirrored data packet.

11. The method of claim 1, wherein said network address information comprises a destination address of said mirrored data packet.

12. The method of claim 1, wherein said network switch is a routing switch.

13. A method to monitor a network switch comprising:
   externally obtaining at least a portion of data packets transmitted from said network switch, wherein each of said data packets comprises network address information;
   extracting said network address information from said obtained portion of data packets;
   determining port information of said network address information in response to said network address information extraction; and
   performing network analysis of said network switch using said port information;
   wherein said network switch comprises a plurality of regular ports and a mirror port, said mirror port being able to mirror network traffic for at least one of said regular ports, wherein said portion of data packets are obtained from said mirror port.

14. The method of claim 13, wherein said port information comprises physical information.

15. The method of claim 13 wherein said network address information comprises source addresses.

16. The method of claim 13 wherein said network address information comprises destination addresses.

17. The method of claim 13 wherein said network switch comprises a plurality of regular ports, wherein said portion of data packets are obtained by passively tapping at least one of said regular ports.

18. The method of claim 13, wherein said network address information extraction and said port information determination are performed in an external monitor device.

19. The method of claim 13 further comprising maintaining at least one lookup table correlating said network address information with said port information.

20. A method to monitor a network switch comprising:
   externally obtaining at least a portion of data packets transmitted from said network switch, wherein each of said data packets comprises network address information;
   extracting said network address information from said obtained portion of data packets;
   determining port information of said network address information in response to said network address information extraction; and
   performing network analysis of said network switch using said port information;

wherein said port information determination comprises interrogating said network switch to obtain said port information using said network address information; and wherein said interrogation comprises:

sending a first request to said network switch requesting a port index corresponding to said network address information; and sending a second request to said network switch requesting said port information corresponding to said port index.

21. The method of claim 20, wherein said port information determination comprises placing said obtained portion of data packets in a first-in-first-out buffer waiting for responses from said network switch.

22. The method of claim 21, wherein said port information determination further comprises releasing a data packet from said first-in-first-out buffer after said network switch responds to said first and second requests.

23. The method of claim 21, wherein said port information determination further comprises releasing a data packet from said first-in-first-out buffer after a predetermined period of time.

24. A method to monitor a network switch, comprising:

externally obtaining at least a portion of data packets transmitted from said network switch, wherein each of said data packets comprises network address information:

extracting said network address information from said obtained portion of data packets; and determining port information of said network address information in response to said network address information extraction wherein said network switch comprises a plurality of regular ports and a mirror port, said mirror part being able to mirror network traffic for at least one of said regular ports, wherein said portion of data packets are obtained from said mirror port.

25. The method of claim 24, further comprising performing network analysis of said network switch using said port information.

26. The method of claim 24 wherein said port information comprises physical information.

27. The method of claim 24 wherein said network address information extraction and said port information determination is performed in an external monitoring device.

28. The method of claim 24, wherein said network address information comprises source addresses.

29. The method of claim 24, wherein said network address information comprises destination addresses.

30. The method of claim 24, wherein said network switch comprises a plurality of regular ports, wherein said portion of data packets are obtained by passively tapping at least one of said regular ports.

31. The method of claim 24, further comprising maintaining at least one lookup table correlating said network address information with said port information.

32. The method of claim 24, wherein said network switch is a routing switch.

33. The method of claim 24, further comprising associating said port information with information contained in said obtained portion of data packets.

34. The method of claim 33, further comprising pertaining network analysis of said network switch using said port information and associated data packet information.

35. A method to monitor a network switch, comprising:

externally obtaining at least a portion of data packets transmitted from said network switch, wherein each of said data packets comprises network address information;

extracting said network address information from said obtained portion of data packets; and determining port information of said network address information in response to said network address information extraction;

wherein said port information determination comprises interrogating said network switch to obtain said portion of port information using said network address information; and wherein said interrogation comprises:

sending a first request to said network switch requesting a port index corresponding to said network address information; and sending a second request to said network switch requesting said port information corresponding to said port index.

36. The method of claim 35, wherein said first request and said second request are SNMP requests.

37. The method of claim 35, wherein said port information determination comprises placing said obtained portion of data packets in a first-in-first-out buffer waiting for responses from said network switch.

38. The method of claim 37, wherein said port information determination further comprises releasing a data packet from said first-in-first-out buffer after said network switch responds to said first and second requests.

39. The method of claim 37, wherein said port information determination further comprises releasing a data packet from said first-in-first-out buffer after a predetermined period of time.

* * * * *